United States Patent Office 3,523,093
Patented Aug. 4, 1970

3,523,093
METHOD OF PRODUCING POLYURETHANES BY REACTING POLYISOCYANATE WITH A PREFORMED POLYMER RESULTING FROM POLYMERIZATION OF ETHYLENICALLY UNSATURATED MONOMERS
Paul Stamberger, 552 W. University Parkway,
Baltimore, Md. 21210
No Drawing. Continuation-in-part of application Ser. No. 256,531, Feb. 6, 1963, which is a continuation-in-part of application Ser. No. 155,467, Nov. 28, 1961. This application Sept. 3, 1964, Ser. No. 394,356
Int. Cl. C08c *17/08;* C08g *22/08, 41/04*
U.S. Cl. 260—2.5
22 Claims

ABSTRACT OF THE DISCLOSURE

Polyurethanes are produced by reacting a mixture of a polyol solvent medium and a preformed normally solid film-forming polymeric material obtained by polymerization of ethylenically unsaturated monomers with a polyisocyanate. The method readily incorporates the normally solid, film-forming polymer into the polyurethane and provides a variety of cellular or nonporous polyurethanes.

---

This application is a continuation-in-part of copending application 155,467, filed Nov. 28, 1961, now abandoned, and of copending application 256,531, filed Feb. 6, 1963, now U.S. Pat. 3,304,273.

This invention relates to novel methods of preparing polyurethanes, to reactive solutions therefor and to products produced by such methods.

Polyurethanes constitute a broad class of polymeric materials having a wide range of physical characteristics. The polymers are produced through the interaction of a polyfunctional isocyanate with a polyfunctional chemical compound having an active hydrogen in its structure such as a polyester, polyesteramide or polyether or mixture of two or more of such materials. This component used in preparing the polyurethane is generally termed by the art the "active-hydrogen-containing material" and is generally liquid or a solid capable of being melted at a relatively low temperature. The materials conventionally used contain hydroxyl groups as the radical having the active hydrogen and thus are generally termed "polyols." The preparation of such materials is shown, for example, in U.S. 2,888,409 and in the patents referred to therein. In addition, other hydroxyl-capped polymers useful as the polyol in preparing polyurethane resins include polyformals as described, for example, in U.S. 3,055,871 to Heffler et al.; the hydroxyl-terminated lactone polyesters described in U.S. 3,051,687 to Young et al.; the alkylene oxide adducts of the alkyl alcohol-styrene polymers as described in U.S. 2,965,615 to Tess, et cetera. For reasons of commercial availability and cost, it is conventional to use polyethers having hydroxyl-terminated chains in the preparation of polyurethane foams and either such polyethers or hydroxyl-terminated polyesters in preparing vulcanizable gum, adhesive, films, et cetera. The polyurethane end products are generally cross-linked to some extent by including with the polyol (which is generally difunctional) a small amount of polyfunctional cross-linking agent.

Despite the variety of physical and chemical properties obtainable by proper selection of the polyisocyanate and the polyol, as well as the conditions under which the reaction is carried out, there are definite limitations in selecting components for desirable properties in the resulting resin. One of the most significant of such limitations arises from the fact that the polyol is generally of relatively low molecular weight arising from the fact that it must be sufficiently liquid to permit mixing and reaction with the polyfunctional polyisocyanate in producing the final polyurethane resin. Further, the use of higher molecular weight components is attended by a variety of other difficulties including handling and compounding problems, the use of inert solvents and the problems attendant thereon as solvent removal, shrinkage, et cetera.

A great deal of art has grown up reflecting the extensive efforts made to incorporate high molecular weight resinous material in polyurethane formulations. Such efforts range from mere mechanical mixtures as described, for example, in U.S. 3,049,505 to Grabowski, to such other means as the addition of a polymer latex as described in U.S. 2,993,013 to Wolfe, wherein an aqueous elastomer latex is added as one component to an isocyanate-terminated polyurethane so that the water phase of the latex reacts with the free isocyanate groups and at the same time the elastomer of the latex is incorporated into the resulting polyurethane.

Another means shown by the art is in U.S. 2,698,838 to Simon et al., wherein a small amount of the desired polymer is dissolved in a large excess of the polyfunctional isocyanate. Where the polymer is inert to the isocyanate, it is merely mechanically incorporated into the resulting polyurethane, while, where a reaction occurs, the reactive radicals in the polymer itself may enter into a reaction with the polyisocyanate.

Still another means shown by the art is in U.S. 3,008,917 to Park et al., wherein an unsaturated liquid monomer such as styrene is added to a polyester-isocyanate adduct which itself contains vinyl unsaturation as by utilizing a polyester prepared from maleic anhydride or similar unsaturated linkages.

Yet another method is shown in U.S. 2,882,260 to Bartl et al. In this process an isocyanate is attached to an ethylenically unsaturated compound, the isocyanate group is then blocked to render it nonreactive and the resulting compound is copolymerized as with styrene or a similar monomer in aqueous emulsion or similar process and the resulting polymeric product is dried and then heated to unblock the isocyanate groups and cause cross-linkage.

Despite the variety and ingenuity displayed by such art, polyurethanes still remain greatly limited in practical methods for the inclusion of higher molecular weight polymers therein. This is particularly true in regard to the inclusion of normaly solid polymers.

Accordingly, it is a primary purpose of the present invention to present novel methods of forming polyurethanes which emloy normally solid, high molecular weight, film-forming polymers in the polyurethane reaction.

It is a further object of the invention to provide a means of incorporating bodying agents in polyurethanes without the necessity of additional non-reactive solvents as carriers for such bodying agents.

Another object of the invention is to incorporate normally solid, high molecular weight, film-forming polymers as one of the reactants in forming polyurethanes whereby the film-forming polymers are chemically incorporated in the resulting polyurethane.

A further object of the invention is to incorporate normally solid, high molecular weight, film-forming polymers in polyurethane resins without complicated or cumbersome processing techniques.

Still another object of the invention is to incorporate a solid, resinous material in polyurethane resins.

It is another object of the present invention to provide a novel method of forming polyurethanes utilizing normally solid, high molecular weight, film-forming polymers as one of the components in the polyurethane reaction.

It is still another object of the present invention to provide a novel process of forming polyurethanes in which a normally solid, high molecular weight, film-forming polymer is one of the reactants, said polymer being used as a solution or dispersion in the polyol which is used to react with the polyfunctitonal isocyanates in forming polyurethanes.

Another object of the present invention is to provide a process for the production of polyurethanes which is carried out with liquid reactants, including a polyfunctional isocyanate, a normally solid, high molecular weight, film-forming polymer in a medium reactive with the isocyanato radical, which involves a minimum of handling and compounding problems, and which results in negligible shrinkage of the polyurethane product.

Another object of the present invention is to provide novel and improved polyurethane resulting from the novel process of the instant application.

These and other objects and advantages of the present invention will become more apparent upon reference to the following detailed description and appended claims.

In essence, the invention of the instant application has two essential aspects. The first of these involves the formulation of a novel composition reactive with isocyanato groups. The second of these involves the reaction of said novel compositions with polyfunctional isocyanates to form novel polyurethanes.

The novel reactive composition of the present invention comprises two essential components: a normally solid, relatively high molecular weight, film-forming polymer having radicals which are reactive with isocyanato radicals and a reactive solvent which is a solvent or dispersing medium for said polymer, and which contains radicals which are reactive with isocyanato radicals. Upon addition of the polyisocyanate to the reactive compositions of the invention, there results a polyurethane in which the film-forming polymer and the reactive solvent both enter into a chemical reaction with the isocyanato group and are chemically and integrally bound in the resulting polyurethanes.

The useful polymers for use in the present invention may be divided into two groups: (a) those which dissolve in the reactive solvent and/or are dispersible therein without mechanical comminution to form a homogenous, stable dispersion, and (b) those which are optically inhomogenous as indicated by substantial visual turbidity and an average particle size of 0.05 micron, preferably not larger than 5 microns. The polymer must be miscible or dispersible in the reactive solvent at relatively low temperatures so that the properties of the solvent are not affected, as by decomposition, degradation or elimination of some of the reactive radicals. For good miscibility, the polymer should have a relatively low softening point if the polymers are soft and cohesive. In certain exceptional cases the polymer are obtained as fine powders from which a fine, stable dispersion can be formed. The resulting dispersions should be stable on cooling. As employed herein, the term "normally solid" indicates that the product is not free flowing at about room temperature. Such polymers may be formed preferably from ethylenically unsaturated monomers and from acetylenically unsaturated monomers. Condensation polymers can also be produced, which may be used, for example, phenol-formaldehyde resins, urea-formaldehyde resins, melamine-formaldehyde resins, polyacetones, polyamides, polyesters, et cetera. In addition, some polymers may be obtained from naturally occurring polymeric materials as, for example, from cellulose, starch, dextrine, zein, alginic acid, et cetera, and may be modified, for example, by etherification or esterification. Examples of specific useful modified materials include cellulose acetatebutyrate and the ethyl ether of cellulose, starch or dextrine. It is only necessary that the film-forming polymer is reactive with isocyanates and is able to form a stable dispersion with the reactive solvent used in preparing the polyurethanes.

Examples of reactive radicals which may be used successfully are —COOH, —OH, —NH$_2$, =NH, —CONH$_2$, substituted ammonias such as quaternary ammonium compounds, mercapto compounds, etc. The preferred reactive radical (i.e., reactive with the isocyanato group) is an active hydrogen [the term "active hydrogen" refers to hydrogen atoms, which, because of their position in the molecule, display activity according to the Zerewitinoff test as described by Wohler in the Journal of the American Chemical Society, vol. 49, page 3181 (1927)].

The film-forming materials useful in the instant invention can be placed in four classes: (1) addition polymers from ethylenically unsaturated monomers; (2) condensation polymers; (3) natural polymers with or without further processing; and (4) reactive resinous solids. The four classes are distinct with respect to their chemical nature and properties, but similar in their ability to form a new reactive composition for forming polyurethanes.

The film-forming polymers used in the instant invention are prepared mostly by conventional techniques. Thus, for example, polymers may be prepared from the ethylenically unsaturated monomers and/or the acetylenically unsaturated monomers by such conventional techniques as suspension, solution, emulsion and bulk polymerization. Block and graft polymerization processes may also be used. The type of polymer, the choice of reactive solvent, their chemical compositions, and the manner of polymerization can strongly affect the solubility of the polymer and also the physical properties of the polyurethane prepared from the reactive compositions. The important characteristic is the chemical nature of both the polymeric substance and the reactive dispersion medium. Suitable polymers are obtained by copolymerization of several monomers or grafting.

With respect to preparing film-forming polymers from ethylenically unsaturated monomers, reactive radicals may be introduced into the polymer in several ways. The polymer may be formed by polymerization in the presence of reactive radical-containing compounds such as alcohols and mercaptans. The reactive radical may be introduced into the film-forming polymer by appropriate treatment of the resulting polymer, as for example, by hydrolyzing the polymer (as hydrolyzing polyvinyl acetate to introduce hydroxyls), by grafting (as in grafting acrylic acid, etc., on a polymerized diene, as described in U.S. 2,859,201), by oxidation (as shown, for example, in U.S. 2,762,790), etc. See also U.S. 2,837,496. It is preferred to incorporate the reactive group by using a monomer which itself contains such reactive group. Thus, in the case of a homopolymer, the ethylenically unsaturated monomer used to form the homopolymer may have at least one such reactive radical attached to the ethylenically unsaturated group (i.e., diene, vinyl group, etc.), which is responsible for the formation of the polymer chain. Similarly, where a copolymer or terpolymer, and the like, is prepared, one or more of the monomers may itself contain at least one such reactive group, the other monomer or monomers not having reactive radicals. Illustrative of monomers which have reactive radicals are acrylic acid, methacrylic acid, crotonic acid, itaconic acid, 2-hydroxyethyl methacrylate, 2-hydroxyethyl acrylate, t-butylaminoethyl methacrylate, dimethylaminoethyl methacrylate, glycidyl acrylate, glycol monoesters of itaconic acid, methyl monoester of itaconic acid, acrylamides or substituted acrylamides, allyl alcohol, maleic acid, fumaric acid, et cetera. Examples of monomers not having reactive radicals of the above type are styrenes, butadienes, acrylic esters, vinyl esters, et cetera. Such compounds include, for example, styrene, vinyl toluene, 2,5-dichlorostyrene, 2,4-dimethyl styrene, butadiene, dichlorobutadiene, isoprene, alkyl acrylates, alkyl methacrylates, vinyl naphthalene, vinyl pyridine, et cetera.

The type of nitrogen bond formed in the reaction of the polyisocyanate and the film-forming polymer will vary depending on the chemical nature of the reactive composition. The chemistry of formation and significance of the type of bonding are known in the art.

If the polymer contains certain types of nitrogen radicals, such as amino or amido radicals, it will also act as a catalyst for the polyurethane formation. Where the reactive radical is carboxyl, it may be desirable to modify the structure of the film-forming polymer for certain purposes. More specifically, it is well known that the reaction product of the —COOH and —N=C=O radicals is an amide plus $CO_2$. This reaction is desirable for foam production but is frequently undesirable when porosity in the finished product is to be avoided. It is a feature of the present invention to avoid porous production formations in such a situation by reacting a salt-forming nitrogen derivative with the carboxyls of the film-forming polymer so as to change the reaction mechanism of the components. (See, for example, applicant's copending application Ser. No. 117,488, filed May 12, 1961.) For example, a primary or secondary amine may be introduced, which will result in the formation of a urea linkage with the —N=C=O radical. Similarly, amino alcohols may be introduced, in which case the hydroxyl group will react with the —N=C=O to form urethane linkages. In these cases, a nonprous film or mass can be obtained with the substituted —COOH radical. The —COOH radical can also be reacted with a polyamine containing at least two free primary amino groups. The available primary amino groups may then be reacted with phosgene to form isocyanato groups so that the material thus obtained would be an isocyanato-containing prepolymer.

The combining weight of the polymer (with respect to the polyisocyanate with which it is to be reacted) will play a significant part in the properties of the polyurethane reaction product since the frequency of the reactive radicals will determine the location and also the number of bonds formed in the reaction between the polymers and the polyisocyanate. More specifically, in order to obtain the most highly useful product following the isocyanate reaction, the reactive film-forming polymer should contain such a minimum number of reactive radicals so that the combining weight of the polymer is not too high, viz, preferably below 4000. Although in certain cases higher combining weights also gave good products, generally speaking, the higher the combining weight with the same polymeric backbone, the softer, more elastic the reaction product; the lower the combining weight, the more rigid the reaction product will be, using the same major components in the product. The reaction rate of the polymer and of the dispersion medium with the isocyanate can be selected to be of the same order of magnitude. The selection of an isocyanate with the desired reactivity or admixtures of several isocyanates with different reactivity is often advisable.

The optimum combining weight for a given reactive polymer (to produce an end product having the most desirable properties) may readily be determined by simple experimentation. Since the combining weight of a given polymer reflects both the particular monomers used in the formation of the polymer as well as the mol ratios of such monomers, it is a simple task to tailor the polymer to a specific, desired combining weight through the proper choice of these variables.

The film-forming polymers are present as dispersions or solutions in a reactive solvent. The reactive compositions thus formed from said polymers are often further dilutable with a reactive solvent of either the same type or of a different type. Where the reactive composition is not dilutable, the polymer should be added to the reactive solvent or solvents at the concentration desired for the ultimate use so that dilution is unnecessary.

The molecular weight of the film-forming polymers used in the present invention will necessarily vary within reasonably wide limits depending upon the particular polymer. The molecular weight is only a rough indication of whether a polymer is a film-former. The film-forming ability of a polymer is determined primarily by its cohesive energy. Conventionally a polymer is considered to be a film-forming polymer when the cohesion in the polymer itself is great enough to produce a film above the "glass" temperature, i.e., above the second order transition temperature. In general, the film-forming polymers used have a molecular weight above 5000, best properties being obtained with film-forming polymers having molecular weights of 10,000 or greater. The upper molecular weight limit is one selected for practical considerations; the reactive compositions are preferably those which are free flowing at the temperature at which reaction with polyisocyanate is carried out, i.e., the composition should have a viscosity at that temperature of less than about 40,000 cps. If the reactive polymer has sufficient reactive radicals to cross-link adequately with the isocyanate, the restriction that the polymer be film-forming may be somewhat relaxed.

As is evident from the list of monomers which may be used to form the film-forming polymers of the present invention, film-forming polymers having either aromatic or aliphatic nucleii (or both) may be employed. The choice of the particular nucleus is dependent upon the final properties desired in the polyurethane. For example, film-forming polymers having predominantly aromatic nucleii will tend to produce stiffer products; those with predominantly aliphatic nucleii will tend to produce softer products. In general, the physical properties of the polymer will reflect in the polyurethanes.

The second essential component of the reactive composition of the present invention is a reactive solvent. The "reactive solvent" used herein is any of a variety of "active-hydrogen-containing materials" known in the art and conventionally used in preparing polyurethane resins.

The reactive solvent must be selected to meet several diverse requirements:

(1) It must act as a solvent or dispersing medium for the film-forming polymer.

(2) It must not be so reactive with the film-forming polymer as to reduce substantially the reactive radical content of either the solvent or the polymer or to form a gel or a hard infusible resin which would interfere or even prevent the reaction with the polyisocyanate.

(3) It should form stable solutions or dispersions with the film-forming polymer which are preferably dilutable without the formation of undesirable precipitates with the components used to form the polyurethane polymer.

(4) It must be a liquid, at least at the temperatures used for the reaction with the polyisocyanate.

(5) It must have at least two radicals which are reactive with the —N=C=O of the polyisocyanate so as to form a polymeric reaction product with the polyisocyanate.

The preferred reactive solvents are the polyols having properties described above. The polyols suitable for production of the reactive compositions can be a hydroxyl-terminated polyester, a polyhydroxyalkane, a polyphenol, a polyoxyalkylene polyol, or the like, having a molecular weight of about 500 and the corresponding mercapto derivatives. Among the polyols which can be employed are one or more polyols from the following classes of compositions; minor amounts of polyhydroxyalkanes can be present:

(a) Hydroxyl-terminated polyesters;

(b) Alkylene oxide adducts of polyhydroxyalkanes;

(c) Trialkanolamines and alkylene oxide adducts thereof;

(d) Alcohols derived from mono- and polyamines by addition of alkylene oxides;

(e) Nonreducing sugars and sugar derivatives and alkylene oxide adducts thereof;

(f) Alkylene oxide adducts of aromatic amine/phenol/aldehyde condensation products;

(g) Alkylene oxide adducts of phosphorus and polyphosphorus acids;

(h) Polyphenols and alkylene oxide adducts thereof;

(i) Polytetramethylene glycols, and the like.

Illustrative hydroxyl-terminated polyesters are those which are prepared by polymerizing a lactone in the presence of an active hydrogen-containing starter as disclosed in U.S. Pat. No. 2,914,556.

Illustrative alkylene oxide adducts of polyhydroxyalkanes include, among others, those adducts of ethylene glycol, propylene glycol, 1,3-dihydroxzypropane, 1,3-dihydroxybutane, 1,4-dihydroxybutane, 1,4-, 1,5-, and 1,6-dihydroxyhexane, 1,2-1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1 - trimethylolethane, 1,1,2-trimethylolpropane, pentaerythritol, xylitol, arabitol, sorbitol, mannitol, and the like, having a molecular weight of at least 500 and preferably the adducts of ethylene oxide, propylene oxide, epoxybutane, or mixtures thereof.

Two particularly preferred classes of alkylene oxide adducts of polyhydroxyalkanes are the ethylene oxide, propylene oxide, butylene oxide, or mixtures thereof, adducts of dihydroxyalkanes and of trihydroxyalkanes.

The preferred class of alkylene oxide adducts of dihydroxyalkanes contemplated are the polyoxyalkylene glycols, such as diethylene glycol, triethylene glycol, tetraethylene glycol, dipropylene glycol, tripropylene glycol, tetrapropylene glycol, dibutylene glycol, high molecular weight polyoxyethylene glycols, high molecular weight polyoxypropylene glycols, mixed ethylene-propylene glycols, mixed polyoxyethylene - polyoxypropylene glycols, and the like.

Further examples of suitable polyesters and polyethers for use as the polyol of the present invention are described in U.S. Pats. 2,814,606; 2,801,990; 2,801,648; 2,777,831; 2,606,162 and 2,432,148. The patents also teach the method of preparing such polyols.

Another useful class of polyols which can be employed are the trialkanolamines and the alkylene oxide adducts thereof. Illustrative trialkanolamines include triethanolamine, triisopropanolamine, and tributanolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides which have 2 to 4 carbon atoms for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylene triamine, triethylenetetramine, 1,3-butanediamine, 1,3-propanediamine, 1,4-butanediamine, 1,2-, 1,3-, 1,4-, 1,5- and 1,6-hexanediamine, phenylenediamines, toluenediamine, naphthalenediamines, and the like. Among the compounds of the above groups which are of particular interest are, among others, N,N,N',N' - tetrakis(2 - hydroxyethyl)ethylenediamine, N,N,N',N' - tetrakis(2-hydroxypropyl)ethylenediamine, N,N,N',N'',N''-pentakis(2-hydroxypropyl)diethylenetriamine, phenyldiisopropanolamine and higher alkylene oxide adducts of aniline, and the like. Others which deserve particular mention are the alkylene oxide adducts of aniline or substituted aniline/formaldehyde condensation products.

A further class of polyols which can be employed are the nonreducing sugars, the nonreducing sugar derivatives and, more preferably the alkylene oxide adducts thereof wherein the alkylene oxides have from 2 to 4 carbon atoms. Among the nonreducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glycoside, and the like.

A still further useful class of alcohols are the polyphenols, and preferably the alkylene oxide adducts thereof wherein the alkylene oxides have from 2 to 4 carbon atoms. Among the polyphenols which are contemplated are found, for example, bisphenol A, bisphenol F, condensation products of phenol and formaldehyde, more particularly the novolac resins, condensation products of various phenolic compounds and acrolein, the simplest members of this class being the 1,1,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenyl)ethanes, and the like.

Another desirable class of polyols are the alkylene oxide adducts, preferably the ethylene oxide, 1,2-epoxypropane, epoxybutane, and mixtures thereof, adducts of aromatic amine/phenol/aldehyde condensation products. The condensation products are prepared by condensing an aromatic amine, for instance, aniline, toluidine, or the like, a phenol such as phenol, cresol, or the like, and an aldehyde, preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the polyols. The propylene oxide and mixed propylene-ethylene oxide adducts of aniline/phenol/formaldehyde condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorous acid, the polyphosphoric acids such as tripolyphosphoric acid, the polymetaphosphoric acids, and the like are desirable for use in this connection.

Another useful class of polyols are the polytetramethylene glycols, which are prepared by polymerizing tetrahydrofuran in the presence of an acidic catalyst.

The polyols employed can have hydroxyl numbers which vary over a wide range. In general, the hydroxyl numbers of the polyols employed in the invention can range from about 20, and lower, to about 1000, and higher, preferably, from about 30 to about 800, and more preferably, from about 35 to about 450. The hydroxyl number is defined as the number of milligrams of potassium hydroxide required for the complete hydrolysis of the fully acetylated derivative prepared from 1 gram of polyol. The hydroxyl number can also be defined by the equation:

$$OH = \frac{56.1 \times 1000 \times f}{m.w.}$$

where

OH = hydroxyl number of the polyol
$f$ = functionality, that is, average number of hydroxyl groups per molecule of polyol
m.w. = molecular weight of the polyol.

The exact polyol employed depends, among other things, upon the end use of the polyurethane product to be produced. For example, in the case of foamed reaction products, the molecular weight of the hydroxyl number is selected preferably to result in flexible, semiflexible, or rigid foams. The above polyols preferably possess a hydroxyl number of from about 200 to about 1000 when employed in rigid foam formulations, from about 50 to about 150 for semiflexible foams, and from about 40 to about 70 or more when employed in flexible foam formulations. Such limits are not intended to be restrictive, but are merely illustrative of the large number of possible combinations of the above coreactants.

The reactive composition (comprising the film-forming polymer in the reactive solvent) contains from 5 to 50 percent by weight of the polymer therein; a preferable concentration is about 15 to 50 percent by weight. Solutions having in excess of 50 percent by weight of the film-forming polymer are ordinarily too viscous for practical purposes.

The isocyanates used to form the polyurethanes of the present invention must be polyfunctional. Examples of such polyisocyanates are the tolylene diisocyanates, hexamethylene diisocyanates, diphenylmethane diisocyanates, naphthalene diisocyanates, triphenylmethane triisocyanates, phenylene diisocyanates, bitolylene diisocyanates, dianisidine diisocyanate, dimethyldiphenylmethane diisocyanates, triisocyanatodiphenyl ethers, et cetera, such as meta-toluene diisocyanate, 4,4'-diphenyl diisocyanate, 4,4'-diphenylene methane diisocyanate, 1,5-naphthalene diisocyanate, 4,4'-diphenyl ether diisocyanate, p-phenylene diisocyanate, ethylene diisocyanate, trimethylene diisocyanate, cyclohexylene diisocyanate, 2-chloropropane diisocyanate, tetrachlorophenylene diisocyanate-1,4-durylene diisocyanate, xylylene diisocyanates, 3,10-diisocyanatatotricyclo [5.2.1.0$^{2,6}$]decane, et cetera. A more complete list of polyisocyanates is set forth by Siefken in Annalen, 562, pp. 122–135 (1949).

The polyisocyanates react both with the film-forming polymer and the solvent so that the polyurethanes formed using the reactive solutions of the instant invention incorporate both of these elements into the chemical structure of the polyurethane. Thus, the resulting polyurethanes constitute a novel group of polymers having substantially different properties than could be obtained by a mere mechanical mixture. It appears that the polyurethanes produced using such reactive compositions comprise not only bonds between the polyisocyanate and the separate reactive groups of the film-forming polymer and the solvent, but also comprise direct chemical bonds between the polymer and the solvent. Thus, such polyurethanes comprise a variety of chemical bonds with consequent effect on the physical and chemical properties of the polyurethanes.

The reactive compositions of the present invention may be used in place of the polyols of the prior art in any of the processes used in preparing polyurethanes. Thus, the solutions may be used in the prepolymer process, the quasi-prepolymer process or the one-shot process. The polyurethanes may be further reacted with epoxy resins, curde with sulfur, peroxides or other curing agents, or otherwise reacted or modified as known to those skilled in the art. In using the one-shot process, as described for example in U.S. 2,866,774 to Price, it is desirable to use a silicone oil emulsifier as described in U.S. 2,834,748 and 2,917,480.

To form the polyurethanes of the present invention, an excess of the polyisocyanate is generally employed. In general, the ratio between the —N=C=O radicals and the other reactive radicals in the reactant mass (including those in the film-forming polymer, the polyol and the other non-isocyanate reactants, if any) is from about 1:1 to 5:1 and, in exceptional cases, up to 6:1.

As aforestated, the viscosity of the reactive composition (comprising the film-forming polymer and the polyol in the ratio desired) generally should be less than about 40,000 cps. under conditions of use. Generally speaking, the viscosity of the reactive composition should be such that the solution is dilutable upon simple mixing with additional quantities of polyfunctional liquid reactants used. The viscosity of the reactive composition should also be low enough to permit easy mixing of the isocyanates with the reactive solution. The term "composition" as used herein in the specification and claims includes dispersions of the film-forming polymer in which the polymer shows marked solvation as indicated by a viscosity increase or wherein the polymer does not separate from solution on storage or during conventional handling.

In carrying out the process of the present invention, the reactive composition is first prepared and then mixed with the polyisocyanate and any other reactants desired. For example, it may be desired to vary the quantity of reactive, nonisocyanate radicals in the reactant mass by adding other active hydrogen-containing compounds.

Because of the great many variables involved in the process of the present invention, i.e., the desired properties of the finished product, the combining weight of the reactants, the type of bonding, the solubility requirements (including the possibility that certain materials will cause an undesirable precipitate to form in the reactive solution), the selection of particular film-forming polymers, solvents and other additives to be employed in the reaction must, in good part, be done on an experimental basis. The complete flexibility of the instant process, however, makes possible the easy adjustment of the reactant mass to conform it to one having desired characteristics.

This invention is further illustrated by the following examples without, however, being restricted thereto. All parts are by weight, unless otherwise specified. Unless otherwise stated in the examples, the polymerization reactions were carried out in a three-necked flask equipped with an agitator, a reflux condenser, a thermometer, the three-necked flask being connected to a nitrogen cylinder. Prior to the addition of the catalyst, the contents of the flask were purged with nitrogen for 30 minutes and heated. After completion of the reaction, toluol was added and the traces of water remaining in the flask were removed by azeotropic distillation or vacuum. The reaction was carried out to an unreacted monomer content of 5 percent maximum.

EXAMPLE 1

A commercial butylated melamine-formaldehyde resin (available under the trade name Cymel 247–10) as a 60% resin solution in butanol was added to a polyol, in this case LG56, a polyoxypropylene triol with an OH equivalent of 55.5 mg. KOH/gm. and an average molecular weight of 3000. The butanol was distilled over at 100° C. under a 40 mm. vacuum to give a 60% solution of the melamine resin in the triol. The solution had the consistency of honey and a hydroxyl number of 97.1. The melamine-polyl solution was diluted with an equal amount of LG56 to give a solution having a viscosity of 12,000 cps. and a hydroxyl number of 72.5. A cellular polyurethane was prepared using 100 gm. of the diluted butylated-melamine-formaldehyde resin-LG56 solution to which was added 2 gm of a silicone surface-active agent, 0.1 gm. N,N,N'N'-tetramethyl-1,3-butanediamine, 0.2 gm. tin octoate and 3.5 gm. of water. These ingredients were thoroughly mixed and then 47.5 gm. of tolylene disocyanate were added rapidly under fast agitation. The mixture was poured out into a mold before considerable foaming had started. A stable, cellular foam was obtained which solidified in about 40 minutes. After 24 hours' standing the foam was fully set, had a density of 0.038 gm./cc. (2.3 lbs. per cubic foot), high compression characteristics and good elasticity.

EXAMPLE 2

10 gm. of ethyl cellulose with a substitution of 47.5 to 49% of ethoxyl groups was dispersed in a triol formed by the condensation of acrolein with phenol, reaction of the condensate with propylene oxide to a hydroxyl number of 380 and dilution of the latter product with LG56 triol to a hydroxyl number of 250. The dispersion was heated to 140° C. for 4 hours. A clear solution was obtained. The resulting reactive solution was made into a cellular polyurethane product following the process described in Example 1. The resulting polyurethane foam had a very low compression set of 6.2% (90% compression for 22 hours at 75° C. using the standard ASTM method).

EXAMPLE 3

In accordance with the present invention 78 parts of vinyl acetate, 17.5 parts by weight of 2-ethylhexyl acrylate and 4.5 parts by weight of hydroxy propyl acrylate were mixed with 0.8 part by weight of tertiary butyl-mercaptan and the resulting mixture was polymerized, using 0.3 part azobisisobutyronitrile as a catalyst, with 25 parts butanol. The resulting polymer, after removal of volatile components was a soft, solid product having a reduced viscosity of 0.19. The polymer was miscible in LG56 triol at 80° C. to provide a clear dispersion. A 25% solution of the polymer in the triol had a viscosity of 1460 cps. Polyurethane foams can be prepared from this solution by reacting it with tolylene diisocyanate in the manner described previously.

EXAMPLE 4

Following the procedures set forth in Examples 3, 69.5 parts of vinyl acetate and 30.5 parts by weight of 2-ethyl hexyl acrylate were mixed with 0.7 part by weight of tertiary butylmercaptan and 17.3 parts n-butanol. The resulting mixture was polymerized with 0.14% azobisisobutyronitrile catalyst at 72° C. The polymer so produced had a reduced viscosity of 0.3. The polymer was miscible in LG56 triol at 30° C. to give a turbid dispersion. A 25% solution of the polymer in the triol had a viscosity of 2500 cps. A good polyurethane can be prepared by reaction of the solution with tolylene diisocyanate. The polymer had an OH equivalent of 22 mg. KOH/g. and was reactive with the isocyanate.

EXAMPLE 5

In accordance with the previously described methods, 100 parts of acrylonitrile and 10 parts of a chain transfer agent comprising tertiary butyl mercaptan were mixed with 50 parts of ethyl benzene, producing a uniform solution, and polymerized. A solid, loose powder formed. Following polymerization the volatile components were removed by vacuum distillation. The polymer formed, a yellow powder, had a reduced viscosity (2½% solution in dimethyl formamide) of 0.55. The powdery polymer could be dispersed in polyols by ball milling; a 20% stable dispersion in LG56 was prepared which had a viscosity of 2500 cps. and a particle size distribution ranging mostly between 2 and 5 microns. In the production of a polyurethane cellular product, 100 parts by weight of the 20% dispersion, 0.75 part by weight of tin octoate, 1.5 parts by weight of surface active silicone compound, 0.1 part by weight of trimethylene diamine, 0.5 part by weight of ethyl morpholin, 2.4 parts by weight water, and 36 parts by weight of tolylene diisocyanate were reacted to provide a flexible cellular polyurethane product which had good elastic properties with only a 6% compression set after seven days of storage. When 20 parts of dimethylformamide which is a solvent for acrylonitrile was included in the above formula, a still greater improvement in the physical properties of the polyurethane was obtained.

EXAMPLE 6

100 parts by weight acrylonitrile and 20 parts of tertiary butylmercaptan were mixed and 25% of the resulting mixture was introduced into a flask containing 10 parts of ethyl benzene and 2 pars azobisisobutyronitrile. The balance of the acrylonitrile-mercaptan mixture was added in a continuous manner to control polymerization temperature at about 80° C. The resulting polymer had a reduced viscosity of 0.72. A 20% dispersion of the polymer in LG56 triol was produced which had a viscosity of 6400 c.p.s. This polymer-polyol dispersion reacted with suitable isocyanates such as tolylene diisocyanate to provide a good polyurethane elastic or plastic product.

EXAMPLE 7

A mixture of 95 parts of acrylonitrile and 5 parts of hydroxypropyl acrylate was added continuously to 50 parts of toluol containing 2 parts of azobisisobutyronitrile catalyst. An acrylonitrile polymer was formed which had a reduced viscosity of 1.85 and a hydroxyl equivalent of 23 mg. KOH/gm. A 20% dispersion of the polymer in LG56 triol had a viscosity of 1600 cps. The triol dispersion was reacted with tolylene diisocyanate using the same formula as in Example 5 to provide a cellular polyurethane having a compression set after 24 hours of 7.2 and otherwise satisfactory properties.

The acrylonitrile polymers produced according to Examples 5, 6 and 7 could be dispersed readily in polyols such as LG56 by suitable methods known in the art. The polymer in the dispersion should have small particle size, such as 5 microns or less and preferably below 2 microns, to prevent settling and separation of the polymer. Such fine powders can be produced per se by spray drying, for example spray drying a fine particle size emulsion polymer in water. This powder can then be dispersed in polyols without milling or other means of particle size reduction.

EXAMPLE 8

Terpolymers have been prepared from various mixtures of styrene with 2-ethyl hexyl acrylate and hydroxy propyl acrylate by mass polymerization with an azo catalyst. These terpolymers were readily dispersed in LG56 triol at temperatures ranging from 70° C. to 100° C. The OH equivalent of the terpolymers ranged from 55 to 59 mg. KOH/gr. The viscosity of 25% to 35% solutions ranged from about 10,000 to 17,000 cps. Such terpolymers can also be obtained by continuous solution polymerization in isopropanol, followed by removal of the solvent. The triol solutions can be reacted with suitable catalysts and polyfunctional isocyanates to form flexible, semirigid and rigid cellular products according to the choice of polyol.

EXAMPLE 9

Following the foregoing procedures, dimethylaminoacrylate which has been freed from inhibitors by distillation is either solution polymerized in ethanol or mass polymerized. A solid film-forming polymer is obtained which has a reduced viscosity (2½% solution in ethanol) of 0.28 and can be readily dispersed in LG56; for example, a 25% dispersion was made which had a viscosity of 15,600 cps. The tertiary amino nitrogen grouping provides excellent catalytic activity for the polyurethane foaming reaction and replaces conventional tertiary amine type catalysts. When from 2 to 5 parts of amino polymer and 0.5 to 1 part of tin octoate catalyst are employed in place of conventional polyurethane catalysts, excellent odorless polyurethane products are obtained.

EXAMPLE 10

Following the foregoing procedures, 63 parts by weight of styrene and 36 parts by weight of 2-ethylhexyl acrylate were copolymerized in n-butanol by the continuous addition of the monomers to the solvent. A catalyst comprising 1.2 parts by weight of azobisiosobutyronitrile and a chain transfer agent comprising 0.4 part by weight of tertiary butyl mercaptan were employed. Following polymerization, the solvent was removed under vacuum. The resulting polymer had a reduced viscosity of 0.13. A 50% by weight dispersion of the polymer in LG56 triol was rapidly prepared at 80° C. and had a viscosity of 47,000 cps. The triol-polymer dispersion is readily reacted with diisocyanates to form cellular polyurethanes.

EXAMPLE 11

Following the foregoing procedures, 63 parts by weight of styrene and 36 parts by weight of 2-ethylhexyl acrylate were copolymerized in isopropanol by the continuous addition of the monomer to the solvent. The catalyst was 0.8 part by weight of azobisisobutyronitrile.

Following polymerization, the solvent was removed under vacuum. The resulting polymer had a reduced viscosity of 0.15 and an OH equivalence of 10.9 mg. KOH per gram. A 50% by weight dispersion of the polymer in LG56 triol was readily prepared at 80° C. and had a viscosity of 95,000. The triol-polymer dispersion is readily dilutable with additional triol to provide a dispersion which is readily reacted with diisocyanates to form cellular polyurethanes.

When styrene and 2-ethylhexyl acrylate were copolymerized in hydrocarbon solvents such as toluol in the manner described previously, the resulting polymer was not compatible with the LG56 triol.

EXAMPLE 12

Following the foregoing procedures, 100 parts by weight of isobutyl acrylate and 2 parts by weight of hydroxypropyl acrylate were copolymerized in a mixture of 50 parts toluol and 10 parts ethylbenzene (which served as both solvent and chain transfer agent) using 0.5 part by weight azobisisobutyronitrile as a catalyst. After removal of the solvent the resulting polymer had a reduced viscosity of 0.23 (as a 2½% solution in acetone) and 0.38 (as a 2½% solution in benzene). The product was not readily dilutable and dispersions of the polymer in polyols tend to be stable only at elevated temperatures. It is necessary therefore to maintain such dispersions at elevated temperatures in the production of polyurethane products.

EXAMPLE 13

The procedure of Example 12 was repeated except that n-butyl-acetate was substituted for isobutyl acrylate After removal of the solvent the polymer had a reduced viscosity of 0.28 (as 2½% solution in acetone) and 0.27 (as a 2½% solution in benzene). A dispersion comprising 25 parts of the polymer dispersed in 75 parts of LG56 had a viscosity of 3600 cps.; the dispersion was readily dilutable with LG56. The dispersion is readily reacted with diisocyantes to form cellular polyurethanes.

In addition to the various previously mentioned advantages of the instant process and improved products, still additional advantages result from the practice of the present invention. For example, the use of a reactive solvent rather than a mere diluent makes unnecessary its removal from the finished product and avoids the shrinkage which invariably attends such removal.

A further advantage lies in the use of the solution of the present invention to increase the viscosity of the composite mixture used for the production of the polyurethanes, which improves the flow properties of the liquids for most of the applications. When making cellular expanded type products, the high viscosity of the mixture will prevent premature escape of gases from the foam cells and a fine-textured product can be produced. Such premature escape of gases frequently causes difficulties in a "one-shot" process, or other processes where the viscosity of the liquid is low. As a result, the prior art limitation to the use of polyesters, polyethers and other preploymers of high viscosity for the polyurethanes reaction is removed. The film-forming polymers act as "bodying" agents in the reactive solutions so that the so-called "one-shot" process can be used more effectively.

Still another advantage of the process of the present invention is the improvement in the load-bearing characteristics of foam products as well as the tensile strength and stability of the foam cells and the physical properties of the polyurethane polymers generally. When nonporous films are made, their hardness, flexibility, abrasion resistance, tensile strength, elongation, rebound and, in general, all of their physical properties can be favorably altered by using the process of the present invention. Thus, film-forming polymers may be easily combined chemically into the polyurethane to produce a new class of polymers having properties more valuable than either material alone. Plasticizers for the polymer component which may have a nonfunctional reactive radical can be used. Other modifiers can be used, such as polymers having reactive radicals which survive the polyurethane-forming reaction. In this latter case, the remaining reactive sites, such as double bond and unreacted carboxyls, can be used as additional cross-linking sites.

As was noted previously, the process of the present invention can also be employed for the introduction of a solid polyfunctional resinous material into a polyurethane product. Thus, derivatives of rosin containing a plurality of reactive radicals permolecule can be employed successfully in the present invention. For example, rosin esters with polyfunctional alcohols containing at least three alcoholic hydroxyl groups per molecule are useful provided the extent of esterification is such that there are at least two unesterified alcoholic hydroxyl groups per ester molecule. Other examples of useful resinous derivatives will readily suggest themselves from the above teaching. The following example serves to illustrate this aspect of the subject invention:

EXAMPLE 14

Fifty parts of trimethylol propane monorosinate, a solid polyfunctional resinous material having an OH equivalent of 171 mg. KOH/gr., were dissolved in 50 parts of a diol having an OH equivalent of 217 (Pluracol TP 740). The resulting solution was mixed with 1 part of tin octoate catalyst; 1.5 parts of a silicone foam stabilizing agent; 0.2 part of triethylenediamine catalyst; 0.5 part of ethyl morpholin; 2.8 parts of water; and 58.5 parts of commercial grade tolylene diisocyanate (calculated as a 105 index, i.e., 5% above the theoretical quantity required to react with the formula components). The product rose rapidly to a stable, cellular foam which solidified in about 50 minutes to a rigid product. After several days of standing at room temperature, the product had high compression strength, rigidity, toughness and some elasticity. The control using the diol gave a much softer product, and showed considerable strinkage and deformation.

The extremely versatile nature of the process of the instant invention makes possible the production of products having a wide variety of characteristics, and can effectively be used for forming not only cellular polyurethane products, but films, coatings, cast or molded articles, et cetera. As is well known, cellular polyurethane products may be obtained by conducting the polyurethane reaction in the presence of a gas-producing agent or "blowing agent" such as water, fluorohydrocarbons, et cetera.

In certain cases where the composite product is a suspension or dispersion in the reactive solvent, for example polyacrylonitriles, the addition of a liquid which acts as a solvent for the polymer in minor quantities is advantageous to enhance the reaction between the reactive radicals attached to the polymer and the isocyanate. Examples of such solvents are dimethylformamide or dimethylsulfoxylate.

When the selected film-forming polymer is produced from a vinyl ester monomer, even where the ester has been hydrolyzed to introduce hydroxyl groups, it has been found necessary to copolymerize the vinyl ester with a substantial portion of a monomer containing reactive radicals or to otherwise introduce additional reactive radicals into the polymer as discussed previously. The hydrolyzed vinyl esters either as homopolymers or copolymrs with monomers free from reactive radicals are insoluble in the reactive solvents and are not disperible therein except with substantial mechanical comminution. Even where mechanical comminution is employed such vinyl polymers are, at best, difficulty dispersible in the reactive solvent; however, when the vinyl ester is copolymerized with monomers containing reactive radicals, e.g. hydroxy proply acrylate, or polymerized such that reactive radicals are introduced by chain transfer as in Example 4, a useful and effective polymer is obtained which can be dispersed in a polyol and employed in the polyurethane forming reaction.

The term "polyurethane," when used in the specification and claims, is to be broadly construed to embrace the polymeric reaction product of isocyanates with compounds containing radicals reactive with —N=C=O radicals of said isocyanates.

What is claimed is:

1. A method for preparing polyurethanes comprising (A) mixing
   (1) a major amount of reactive solvent medium, consisting essentially of at least one normally liquid polyol and having a molecular weight of at least about 500, with
   (2) a minor amount of a preformed normally solid, film-forming polymereric material having a molecular weight of at least about 5,000 and containing radicals reactive with isocyanato radicals said polymeric material being selected from the group consisting of homopolymers of an ethylenically unsaturated monomer having a radical reactive with isocyanato radicals, polymers of a plurality of ethylenically unsaturated monomers in which at least one of the monomer species contains a radical reactive with isocyanato radicals, and, polymers produced by polymerization of ethylenically unsaturated monomers in a monofunctional active hydrogen-containing solvent selected from the group consisting of alcohols and mercaptans, and (B) reacting the resultant mixture with an organic polyisocyanate to form such polyurethane, the ratio of the —N=C=O equivalents of polyisocyanate to radicals of said mixture which are reactive with isocyanato radicals being in the range of about 1–5 to 1.

2. A method as defined in claim 1 wherein said reactive radicals have an active hydrogen and are selected from the group consisting of —COOH, —OH, —NH$_2$, =NH, —SH, and —CONH$_2$.

3. A method as defined in claim 1 wherein said film-forming polymer is selected from the group consisting of homopolymers of an ethylenically unsaturated monomer containing at least one radical reactive with the isocyanato radical and polymers of a plurality of ethylenically unsaturated monomers in which at least one of the monomer species contains a radical reactive with isocyanato radicals.

4. A method as defined in claim 3 wherein said film-forming polymer is a homopolymer.

5. A method as defined in claim 3 wherein said film-forming polymer is a polymer resulting from the polymerization of a plurality of ethylenically unsaturated monomers, at least one of said monomers being free of radicals reactive with isocyanato radicals.

6. A method as defined in claim 5 wherein the ethylenically unsaturated monomer which is substantially free of reactive radicals is selected from the group consisting of styrenes, butadienes, acrylic esters, and vinyl esters.

7. A method as defined in claim 3 wherein said film-forming polymer is a polymer resulting from the polymerization of a plurality of ethylenically unsaturated monomers, each of said monomers containing at least one redical reactive with isocyanato radicals.

8. A method as defined in claim 3 wherein said ethylenically unsaturated monomer is selected from the group consisting of acrylic acid, methacrylic acid, crotonic acid, itaconic acid, 2-hydroxyethyl methacrylate, hydroxyethyl acrylate, hydroxypropyl acrylate, hydroxypropyl methacrylate, t-butylaminoethyl methacrylate, dimethylaminoethyl methacrylate, glycidyl acrylate, diglycol esters of itaconic acid, glycol monoesters of itaconic acid, methyl monoester of itaconic acid, allyl alcohol, maleic acid, fumaric acid, acrylamides and substituted acrylamides.

9. A method as defined in claim 1 wherein said film-forming polymer is a polymer resulting from the polymerization of an ethylenically unsaturated monomer in a solvent medium which is monofunctional in radicals reactive with isocyanato radicals selected from the group consisting of alcohols or mercaptans and wherein said polymer is separated from said solvent medium prior to the mixing of said polymer with the said reactive polyol solvent.

10. A method as defined in claim 9 wherein said ethylenically unsaturated monomer is selected from the group consisting of styrenes, butadienes, acrylic esters and vinyl esters and said solvent medium is selected from the group consisting of lower aliphatic alcohols and lower aliphatic thioalcohols.

11. A method as defined in claim 1 wherein said film-forming polymer contains amino groups.

12. A method according to claim 1 wherein said film-forming polymer has a molecular weight of at least about 10,000.

13. A method as defined in claim 1 wherein a normally solid film-forming polymer formed by polymerizing an ethylenically unsaturated monomer containing tertiary amino groups is mixed with said reactive solvent and said normally solid, film-forming polymer containing reactive radicals prior to the polyurethane forming reaction.

14. A method as defined in claim 1 wherein the polyol is a polyether polyol.

15. A method as defined in claim 1 wherein the polyol is a polyester polyol.

16. A method as defined in claim 1 wherein the mixture comprising the film-forming polymer is reacted with the polyfunctional organic isocyanate in the presence of a blowing agent.

17. A method of preparing polyurethanes comprising polymerizing ethylenically unsaturated monomers free of radicals reactive with isocyanato radicals in the reactive presence of a monofunctional material selected from the group consisting of solvents for said polymerizable material which contain only a single radical reactive with isocyanato radicals and chain transfer agents for said polymerizable material which contain only a single radical reactive with isocyanato radicals to form a normally solid, film-forming polymer having a molecular weight of at least about 5,000; mixing said preformed polymer with a major amount of a reactive solvent medium, consisting essentially of at least one normally liquid polyol having a molecular weight of at least about 500 and reacting the resulting mixture with a poly-functional organic isocyanate to form said polyurethane.

18. A method according to claim 17 wherein said polymerizable material comprises an acrylic derivative free of active hydrogen.

19. A method according to claim 17 wherein said polymerizable material comprises acrylonitrile.

20. A method according to claim 17 wherein said polymerizable material comprises a styrene.

21. A method according to claim 17 wherein said polymerizable material comprises a butadiene.

22. A method according to claim 17 wherein said polymerizable material comprises a vinyl ester.

References Cited

UNITED STATES PATENTS

| | | | |
|---|---|---|---|
| 2,349,756 | 5/1944 | Pratt | 260—57 |
| 2,577,279 | 12/1951 | Simon et al. | 260—2.5 |
| 2,591,884 | 4/1952 | Simon et al. | 260—2.5 |
| 2,850,474 | 9/1958 | Maxey | 260—45.3 |
| 2,995,531 | 8/1961 | Hudson | 260—18 |
| 3,024,209 | 3/1962 | Ferrigno | 260—2.5 |
| 3,028,353 | 4/1962 | Eliner et al. | 260—38 |
| 3,105,063 | 9/1963 | Damusis | 260—77.5 |
| 3,135,707 | 6/1964 | Nyquist et al. | 260—2.5 |
| 3,135,708 | 6/1964 | Mueller et al. | 260—2.5 |

(Other references on following page)

UNITED STATES PATENTS

| | | | |
|---|---|---|---|
| 3,186,969 | 6/1965 | Cox et al. | 260—51.5 |
| 3,180,854 | 4/1965 | Schneider et al. | 260—77.5 |
| 3,202,620 | 8/1965 | Merten et al. | 260—2.5 |
| 3,304,273 | 2/1967 | Stamberger | 260—2.5 |
| 2,636,015 | 4/1953 | Schmutzler | 260—33.2 |
| 2,884,336 | 4/1959 | Lashaek et al. | 260—77.5 XR |
| 3,007,894 | 11/1961 | Bunge et al. | 260—858 |
| 3,025,268 | 3/1962 | Dux et al. | 260—77.5 |
| 3,028,367 | 4/1962 | O'Brien | 260—77.5 |
| 3,056,764 | 10/1962 | Graham et al. | 260—78.4 |

FOREIGN PATENTS 877,289  9/1961  Great Britain.

DONALD E. CZAJA, Primary Examiner

H. S. COCKERAM, Assistant Examiner

U.S. Cl. X.R.

260—6, 9, 13, 24, 29.1, 33.4, 51, 51.5, 67.6, 69, 75, 75.5, 78, 78.3, 859